United States Patent
Pitakdumrongkija et al.

(10) Patent No.: US 9,577,740 B2
(45) Date of Patent: Feb. 21, 2017

(54) RADIO COMMUNICATION SYSTEM AND COMMUNICATION METHOD

(71) Applicants: Boonsarn Pitakdumrongkija, Tokyo (JP); Yoshikazu Kakura, Tokyo (JP); Naoto Ishii, Tokyo (JP)

(72) Inventors: Boonsarn Pitakdumrongkija, Tokyo (JP); Yoshikazu Kakura, Tokyo (JP); Naoto Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 14/380,674

(22) PCT Filed: Feb. 21, 2013

(86) PCT No.: PCT/JP2013/000970
§ 371 (c)(1),
(2) Date: Aug. 22, 2014

(87) PCT Pub. No.: WO2013/125226
PCT Pub. Date: Aug. 29, 2013

(65) Prior Publication Data
US 2015/0304018 A1    Oct. 22, 2015

(30) Foreign Application Priority Data

Feb. 24, 2012  (JP) .................. 2012-038493

(51) Int. Cl.
*H04L 5/14*     (2006.01)
*H04B 7/155*    (2006.01)
(Continued)

(52) U.S. Cl.
CPC .... *H04B 7/15592* (2013.01); *H04W 72/0446* (2013.01); *H04W 16/26* (2013.01);
(Continued)

(58) Field of Classification Search
CPC .......... H04B 7/15592; H04W 72/0446; H04W 16/26; H04W 92/20; H04W 72/082; H04W 84/047
(Continued)

(56) References Cited

U.S. PATENT DOCUMENTS

2011/0223855 A1*  9/2011  Frenger ................ H04B 7/155
                                                 455/9
2011/0280177 A1   11/2011  Horiuchi et al.
(Continued)

FOREIGN PATENT DOCUMENTS

EP        2384072         11/2011
WO    WO-2010/087174       8/2010
(Continued)

OTHER PUBLICATIONS

Sharp, Interface between relay peer-nodes in LTE-Advanced, Mar. 23-17, 2009. (From Applicant's IDS filed on Aug. 22, 2014).*
(Continued)

*Primary Examiner* — Mang Yeung
(74) *Attorney, Agent, or Firm* — Wilmer Cutler Pickering Hale and Dorr LLP

(57) ABSTRACT

A communication system includes a plurality of DeNBs (base stations) and a plurality of RNs (relay nodes), wherein each RN has a radio connection with a DeNB. Each DeNB acquires time resource configuration applied between another base station and a relay node connected with said another base station.

9 Claims, 20 Drawing Sheets

(51) Int. Cl.
*H04W 72/04* (2009.01)
*H04W 16/26* (2009.01)
*H04W 92/20* (2009.01)
*H04W 72/08* (2009.01)
*H04W 84/04* (2009.01)

(52) U.S. Cl.
CPC ........ *H04W 72/082* (2013.01); *H04W 84/047* (2013.01); *H04W 92/20* (2013.01)

(58) Field of Classification Search
USPC ....... 370/226, 243, 246, 274–275, 279, 293, 370/297, 315, 316, 429, 501
See application file for complete search history.

(56) References Cited

U.S. PATENT DOCUMENTS

2012/0263098 A1    10/2012   Takahashi et al.
2013/0028169 A1*   1/2013    Bontu ................ H04B 7/15542
                                                    370/315
2013/0137364 A1*   5/2013    Redana .............. H04B 7/15528
                                                    455/9

FOREIGN PATENT DOCUMENTS

WO    WO-2011/043325    4/2011
WO    WO-2011/135764    11/2011

OTHER PUBLICATIONS

RP-100953, "Work Item Description": Relays for LTE, 3GPP, (http://www.3gpp.org/DynaReport/WID-history--460213.htm), Sep. 14, 2010 (4 pages).

TR 36.814 V9.0.0, "3rd Generation Partnership Project; Technical Specification Group Radio Access Network; Evolved Universal Terrestrial Radio Access (E-UTRA); Further Advancements for E-UTRA Physical Layer Aspects (Release 9)" 3GPP, Mar. 2010 (104 pages).

TS 36.300 v10.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description Stage 2 (Release 10)" 3GPP, Jun. 2011 (194 pages).

Yasuaki Yuda et al., "Interference Mitigation Using Coordinated Backhaul Timing Allocation for LTE-Advanced Relay Systems," ICC 2011, IEEE (5 pages).

Sharp, Interface Between relay peer-nodes in LTE-Advanced, 3GPP TSG RAN WG2 Meeting #65bis R2-092036, Mar. 27, 2009, 3 pages.

International Search Report corresponding to PCT/JP2013/000970, mailing date Apr. 2, 2013, 3 pages.

Written Opinion corresponding to PCT/JP2013/000970, mailing date Apr. 2, 2013, 4 pages.

* cited by examiner

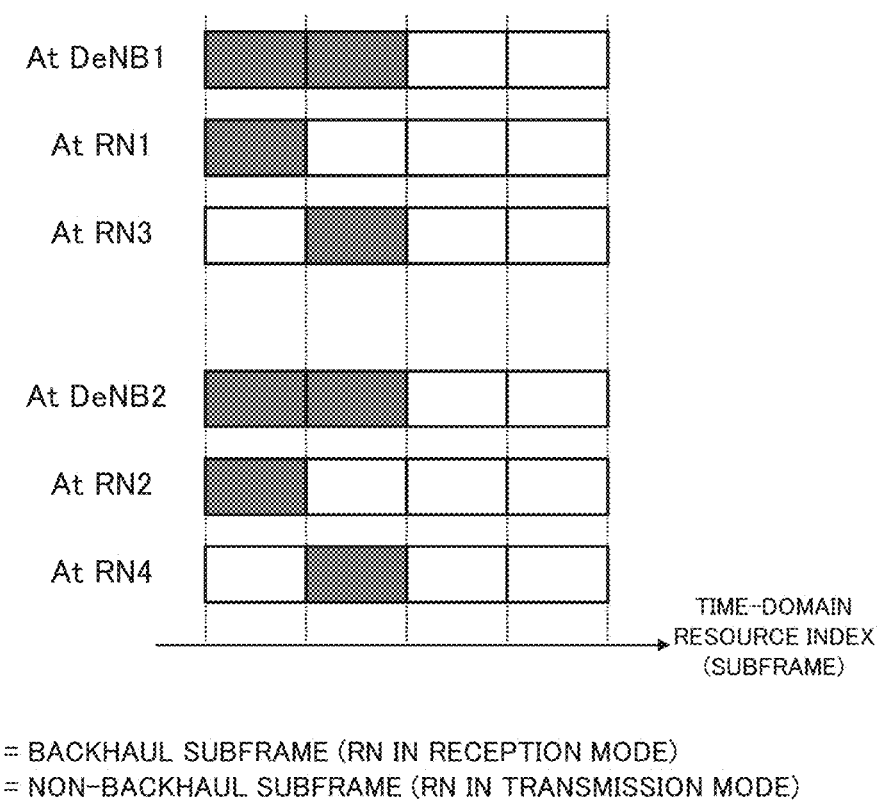

FIG. 11A
VARIATION 1
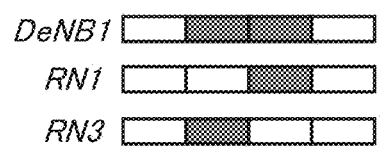
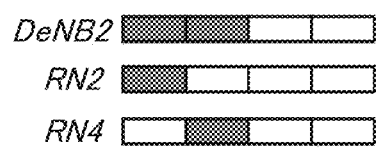
$S_{update} = 6+7$
FIG. 11B
VARIATION 2
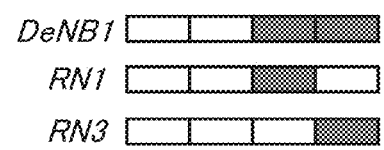
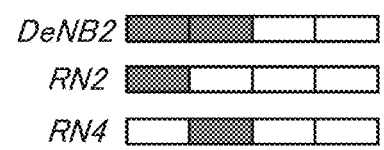
$S_{update} = 6+6$ Illustrative Embodiment 2

Illustrative Embodiment 3

Illustrative Embodiment 4

RADIO COMMUNICATION SYSTEM AND COMMUNICATION METHOD

CROSS-REFERENCE TO RELATED APPLICATIONS

This application is a national stage application of International Application No. PCT/JP2013/000970 entitled "RADIO COMMUNICATION SYSTEM AND COMMUNICATION METHOD" filed on Feb. 21, 2013, which claims priority to Japanese Patent Application No. 2012-038493 filed on Feb. 24, 2012, the disclosures of which are hereby incorporated by reference in their entirety.

TECHNICAL FIELD

The present invention relates to a radio communication system employing relay nodes, and more particularly to techniques of notifying radio resource assignment in the radio communication system.

BACKGROUND ART

3GPP (3rd Generation Partnership Project) LTE-Advanced (Long Term Evolution Advanced) Work Item develops a relay node (hereafter referred to as RN) for deployment in a cellular network. One of the main objectives for deploying RNs is to enhance coverage area of a base station by improving throughput of a mobile station (user terminal) that locates in a coverage hole or far from the base station (see NPL1). Hereafter, a base station is referred to as BS or eNB (evolved Node B) and a mobile station or user terminal is referred to as UE (user equipment).

In the cellular network with RNs, eNB that can provide radio connection to a RN is called Donor eNB, which is hereafter denoted by DeNB. Note that, in this description, the terms eNB and DeNB are distinguished such that eNB is a base station without any RN connecting to it and DeNB is a base station with at least one RN connecting to it. The radio connection between the DeNB and RN is called a backhaul link (or Un interface) and hereafter, a RN "having a backhaul link connection with" a certain DeNB will be referred to as the RN "registered to" that DeNB. Moreover, the term DeNB-UE is used for referring to UE that establishes a radio connection with DeNB, and the term RN-UE is used for referring to UE that establishes a radio connection with RN. The radio connection between DeNB and DeNB-UE is referred to as DeNB-access link, and the radio connection between RN and RN-UE is referred to as RN-access link (or Uu interface). Currently, 3GPP RAN Working Groups (RAN WGs) are mainly considering a RN called Type1 RN that shares common radio resources among the DeNB-access link, RN-access link, and backhaul link. In order to prevent self-interference at the Type1 RN between the backhaul and RN-access links, both links are time-division multiplexed by semi-statically configuring time-domain radio resources called backhaul subframes, that only allow communication between DeNB and RN (see NPL2 and NPL3).

As shown in FIG. 1, it is assumed for simplicity that the cellular network is composed of different DeNB1 and DeNB2 each controlling different macro-cells (donor-cells) and multiple RNs, which may be registered to the same DeNB or registered to different DeNB1 and DeNB2. In this example, relay nodes RN1 and RN2 are registered to DeNB1 and DeNB2, respectively. The RN1 controls a relay-cell1 and mobile stations RN1-UE1 and RN1-UE2 and the RN2 controls a relay-cell2 and mobile stations RN2-UE1 and RN2-UE2. In downlink communication, it is further assumed that, when the RN1 and RN2 transmit data to their RN-UEs at the same time, interference between RN-access links occurs as shown by dashed lines in FIG. 1, causing the capacity of a RN to be limited.

In order to solve this problem, the backhaul subframe coordination method as in [NPL4] can be applied. In specific, NPL4 discloses the relay network in which the DeNB coordinates timing allocation for transmitting backhaul link data to each of the multiple RNs (hereafter referred to as backhaul subframe configuration applied at the RN) such that the backhaul subframe timings are differentiated. Therefore, each RN can have different timings compared with the other RNs, for receiving and transmitting the backhaul and RN-access link data, respectively, allowing the interference between RN-access links in the network to be reduced.

CITATION LIST

Non Patent Literature

[NPL 1]
RP-100953, "Work item description: Relays for LTE," 3GPP
[NPL 2]
TR 36.814 v9.0.0, "E-UTRA: Further advancements for E-UTRA physical layer aspects (Release 9)," 3GPP
[NPL 3]
TS 36.300 v10.4.0, "E-UTRA and E-UTRAN: Overall description, Stage 2 (Release 10)," 3GPP
[NPL 4]
Y. Yuda, A. Iwata, and D. Imamura, "Interference mitigation using coordinated backhaul timing allocation for LTE-Advanced relay systems," ICC 2011, IEEE

SUMMARY

Technical Problem

In order to effectively coordinate backhaul subframe configurations between the RNs registered to different DeNBs, and reduce interference between their RN-access links, the DeNB requires the knowledge of the current backhaul subframe configurations applied at RNs registered to itself and at the RNs registered to another DeNB. This is because such information is necessary for initializing the backhaul subframe coordination.

Currently, the method for a DeNB to acquire a backhaul subframe configuration applied at a certain RN is disclosed in NPL3. In specific, NPL3 discloses that in the relay network, the DeNB configures backhaul subframes at each RN registered to itself through the RRC (Radio Resource Control) re-configuration procedure. Therefore, the above-described method of NPL3 only enables the DeNB to have the information of the backhaul subframe configurations applied at the RNs registered to it.

However, the information of the backhaul subframe configuration applied at the RNs registered to different DeNBs is also necessary for coordinating interference. The method disclosed in NPL3 cannot provide such information and therefore the DeNB cannot coordinate interference coming from RNs registered to different DeNBs.

Accordingly, the present invention has been accomplished in consideration of the above mentioned problem, and an object thereof is, to provide a radio communication system and a communication method which can achieve coordination of interference between RNs registered to different DeNBs.

Solution to Problem

According to the present invention, a communication system includes a plurality of communication nodes which includes a plurality of base stations and a plurality of relay nodes, wherein each relay node has a radio connection with a base station, wherein each base station acquires time resource configuration applied between another base station and a relay node connected with said another base station.

According to the present invention, a communication method in a communication system comprising a plurality of communication nodes which includes a plurality of base stations and a plurality of relay nodes, wherein each relay node has a radio connection with a base station, the method includes the steps of: at each base station, acquiring time resource configuration applied between another base station and a relay node connected with said another base station.

According to the present invention, a base station in a communication system comprising a plurality of communication nodes which includes a plurality of base station and a plurality of relay nodes, wherein each relay node has a radio connection with a base station, includes: a communication section for communicating with a relay node by a radio interface and communicating with another base station by a predetermined interface; and a controller for acquiring time resource configuration applied between another base station and a relay node connected with said another base station. According to the present invention, a relay node device in a communication system comprising a plurality of communication nodes which includes a plurality of base stations and a plurality of relay nodes, includes: a radio communication section for communicating with a base station and another relay node; and a controller for acquiring information indicating time resource configuration applied at a relay node connected with another base station and reporting the information to the base station.

Advantageous Effects of Invention

As described above, according to the present invention, a DeNB can coordinate interference between RNs registered to different DeNBs.

BRIEF DESCRIPTION OF DRAWINGS

FIG. 10 is a schematic diagram showing an example of current backhaul subframe configurations.

FIG. 11(A) and FIG. 11(B) are diagrams showing variations of backhaul subframe configuration.

DETAILED DESCRIPTION

Figure 1:
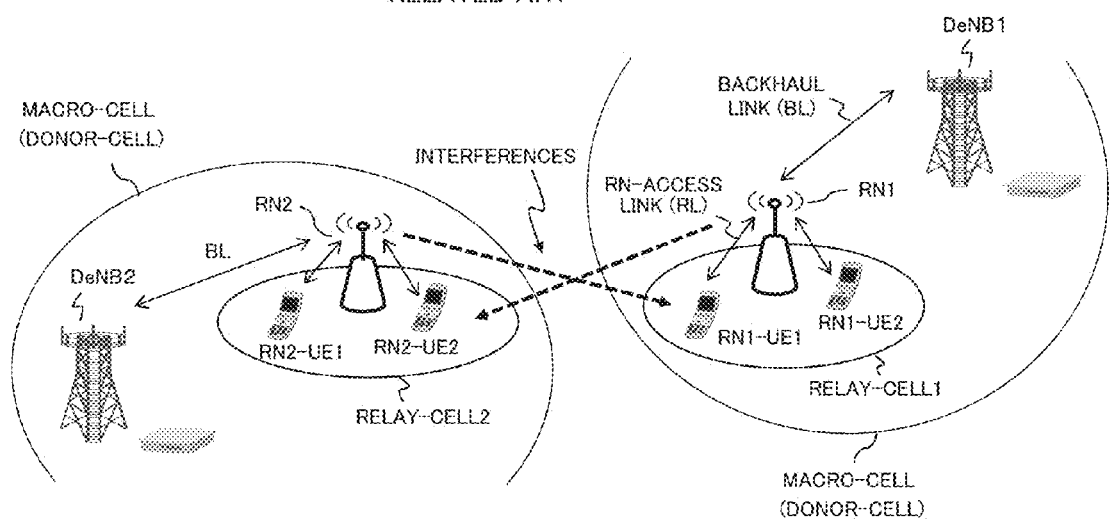
FIG. 1 is a schematic diagram of an illustrative configuration of a radio communication system employing a conventional communication control.
Figure 2:
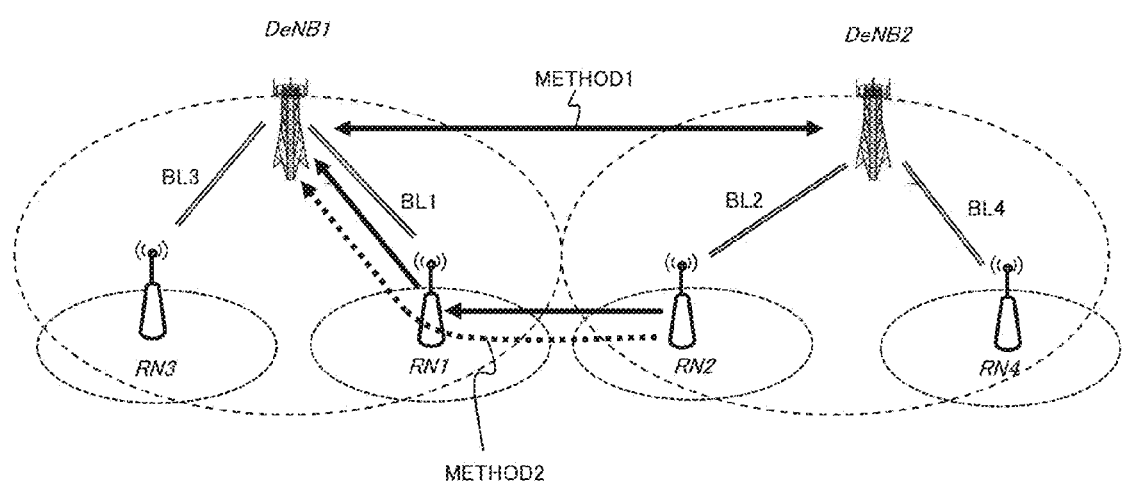
FIG. 2 is a diagram showing an example of a radio communication system for explaining an outline of the present invention.

First, an outline of the present invention will be described by referring to FIG. 2. According to illustrative embodiments of the present invention, each DeNB acquires time resource configuration applied between another DeNB and a RN registered to the other DeNB, that is, backhaul subframe configuration. More specifically, two acquisition methods METHOD1 and METHOD2 are shown in FIG. 2.

METHOD1: DeNB1 and DeNB2 exchange the information of backhaul subframe configuration with each other.

METHOD2: RN1 registered to DeNB1 detects the backhaul subframe configuration of RN2 registered to DeNB2 and reports the detected backhaul subframe configuration to DeNB1.

A radio communication system to which the illustrative embodiments are applied will be explained as an example by making references to FIGS. 3-6.

Figure 3:
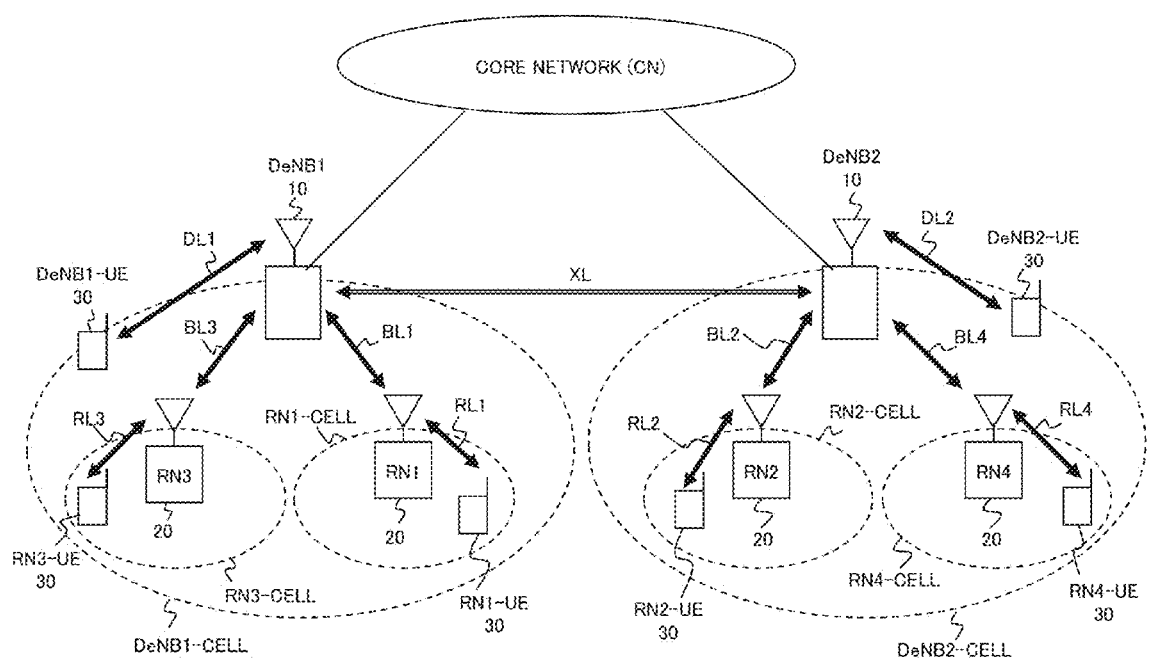
FIG. 3 is a schematic diagram showing an example of a radio communication system which is common for illustrative embodiments of the present invention.

As shown in FIG. 3, it is assumed for simplicity that a radio communication system is comprised of a plurality of nodes which include base stations (DeNB1, DeNB2) labeled with common reference numeral "10", relay nodes (RN1-RN4) labeled with common reference numeral "20", and user equipments (DeNB1-UE, RN1-UE, RN3-UE, DeNB2-

UE, RN2-UE, RN4-UE) labeled with common reference numeral "30". The DeNB1 controls a macro cell or donor cell (DeNB1-CELL), DeNB1-UE, RN1 and RN3. The RN1 controls a relay cell (RN1-CELL) and RN1-UE, and the RN3 controls a relay cell (RN3-CELL) and RN3-UE. The DeNB2 controls a macro cell or donor cell (DeNB2-CELL), DeNB2-UE, RN2 and RN4. The RN2 controls a relay cell (RN2-CELL) and RN2-UE, and the RN4 controls a relay cell (RN4-CELL) and RN4-UE. The DeNB1 provides a radio connection to the DeNB1-UE through a DeNB-access link DL1 and radio connections to the RN1 and RN3 through backhaul links (or Un links) BL1 and BL3, respectively. The RN1 also provides a radio connection to the RN1-UE through RN-access link (or Uu link) RL1, and RN3 also provides a radio connection to the RN3-UE through RN-access link (or Uu link) RL3. Similarly, The DeNB2 provides a radio connection to the DeNB2-UE through a DeNB-access link DL2 and radio connections to the RN2 and RN4 through backhaul links (or Un links) BL2 and BL4, respectively. The RN2 also provides a radio connection to the RN2-UE through RN-access link (or Uu link) RL2, and RN4 also provides a radio connection to the RN4-UE through RN-access link (or Uu link) RL4. The DeNB1 and the DeNB2 are connected to each other through a XL interface and are connected to a core network (CN). Although FIG. 3 shows a single DeNB-UE and a single RN-UE for each RN-CELL, each DeNB and each RN are capable of providing connections to multiple UEs simultaneously.

Figure 4:
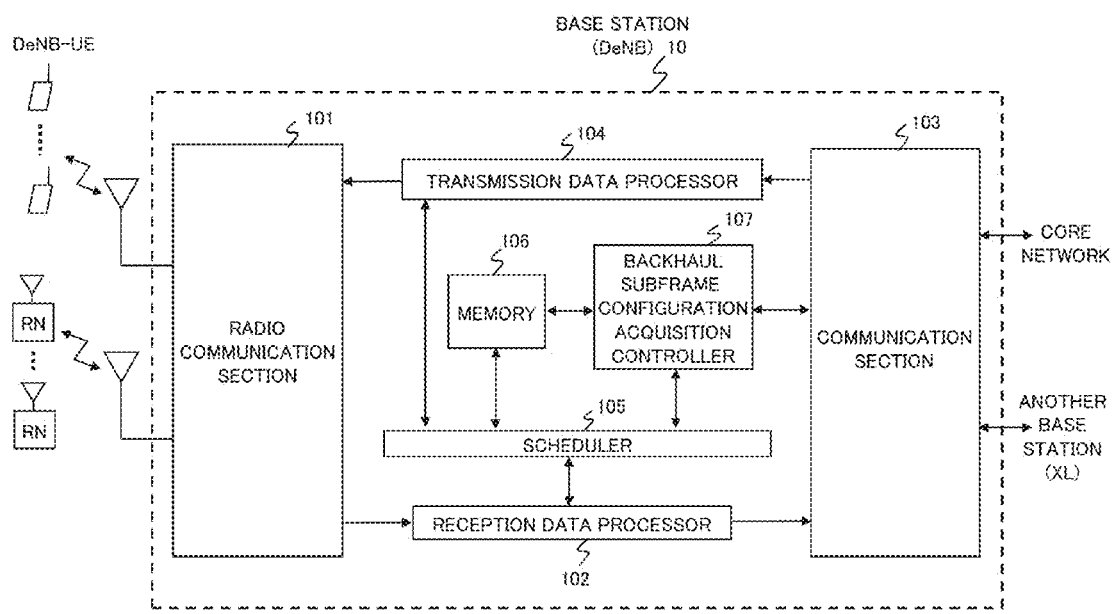
FIG. 4 is a block diagram of an illustrative configuration of a base station which is common for illustrative embodiments of the present invention.

Referring to FIG. 4, DeNB 10 (DeNB1, DeNB2) is provided with a radio communication section 101 which performs radio communications with the DeNB-UE and the RNs through antennas. The radio communication section 101 receives uplink signals from the DeNB-UE and the RNs and outputs the uplink received signals to a reception data processor 102. The reception data processor 102 performs procedures including signal combining, demodulation, and channel decoding to retrieve data from the uplink received signals. The resulting received data are forwarded to a core network through a communication section 103. When receiving a request or report about the backhaul subframe configuration from a backhaul subframe configuration acquisition controller 107, the communication section 103 forward it to another base station through the XL interface. When receiving information or request related to backhaul subframe configuration from another DeNB through the XL interface, the communication section 103 forward it to a backhaul subframe configuration acquisition controller 107.

A transmission data processor 104 stores data received from the communication section 103 in a buffer (not shown) before transmitting to the DeNB-UE and the RNs. The transmission data processor 104 performs channel encoding, rate matching, and interleaving on the data stored in the buffer in order to create transport channels. Then, the transmission data processor 104 adds control information to the transport channels and creates radio frames. The transmission data processor 104 also performs symbol mapping and creates transmission symbols. The radio communication section 101 modulates and amplifies transmission symbols to create downlink signals and then transmits the downlink signals to the DeNB-UE and the RNs through the antennas.

A scheduler 105 controls radio resource allocation for transmitting data to the DeNB-UEs and the RNs by considering scheduling metrics of the DeNB-UEs and the RNs. The scheduling metrics are created by the scheduler 105 based on channel qualities of DeNB-access links DLs and the backhaul links BLs, and priorities of data to be transmitted to the DeNB-UEs and the RNs. When receiving information related to backhaul subframe configuration from a RN through the reception data processor 102, the scheduler 105 sends the information to the backhaul subframe configuration acquisition controller 107.

A memory 106 stores or updates backhaul subframe configurations based on demand from the backhaul subframe configuration acquisition controller 107. The backhaul subframe configuration acquisition controller 107 transmits or receives information or a request related to backhaul subframe configuration through the communication section 103. The backhaul subframe configuration acquisition controller 107 receives information related to backhaul subframe configuration from the scheduler 105 and stores the information in the memory 106.

Functions of the reception data processor 102, the transmission data processor 104, the scheduler 105 and the backhaul subframe configuration acquisition controller 107 can be implemented by a program-controlled processor such as a CPU (central processing unit) or a computer running respective programs which are stored in a memory (not shown).

Figure 5:
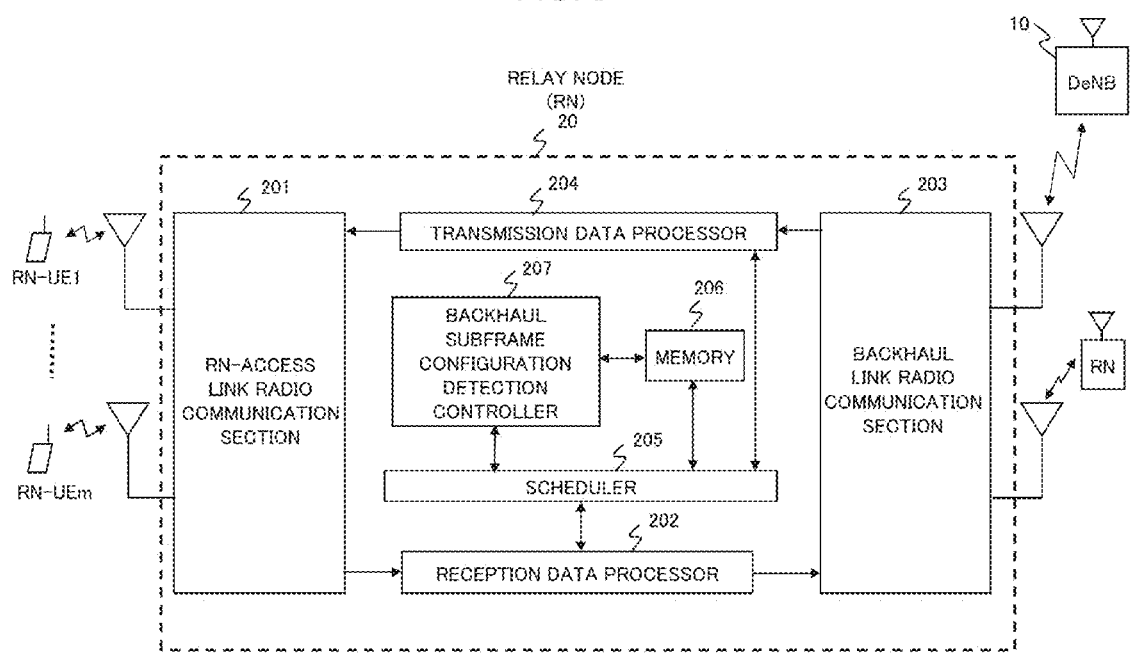
FIG. 5 is a block diagram of an illustrative configuration of a relay node which is common for the illustrative embodiments.

Referring to FIG. 5, it is assumed that RN 20 is registered to the DeNB 10 and has the same functionalities as DeNB with some exceptions that will be explained explicitly. A RN-access link radio communication section 201 receives uplink signals from RN-UEs through antennas. A reception data processor 202, similar to the reception data processor 102 of the DeNB 10, forwards the received data to the DeNB 10 through a backhaul link radio communication section 203. A transmission data processor 204 and its buffer (not shown), similar to the transmission data processor 104 and its buffer of the DeNB 10, creates transmitted symbols based on data destined to the RN-UEs received from the backhaul link radio communication section 203. Then, the RN-access link radio communication section 201 creates downlink signals from the transmitted symbols and transmits them to the RN-UEs.

A scheduler 205 controls radio resource allocation for transmitting data to the RN-UEs by considering scheduling metrics of RN-UEs. The scheduling metrics are created by the scheduler 205 based on channel qualities of the RN-access links RLs, and priorities of data to be transmitted to the RN-UEs. The scheduler 205 is controlled by a backhaul subframe configuration detection controller 207 to acquire backhaul subframe configuration from another RN. When having acquired the backhaul subframe configuration from another RN, the scheduler 205 forwards the acquired backhaul subframe configuration of another RN to the DeNB 10 through the reception data processor 202. When receiving a report of determined backhaul subframe configuration from the DeNB 10, the scheduler 205 controls radio resource allocation for transmitting data to RN-UEs according to the determined backhaul subframe configuration.

A memory 206 stores or updates the backhaul subframe configuration based on demand of the backhaul subframe configuration detection controller 207.

The backhaul subframe configuration detection controller 207 controls the scheduler 205 to acquire necessary information for determining backhaul subframe configuration of another RN. When receiving the necessary information from the other RN, the backhaul subframe configuration detection controller 207 determines the backhaul subframe configuration and stores it in the memory 206 and sends a report of the determined backhaul subframe configuration to the DeNB 10 through the scheduler 205.

Figure 6:
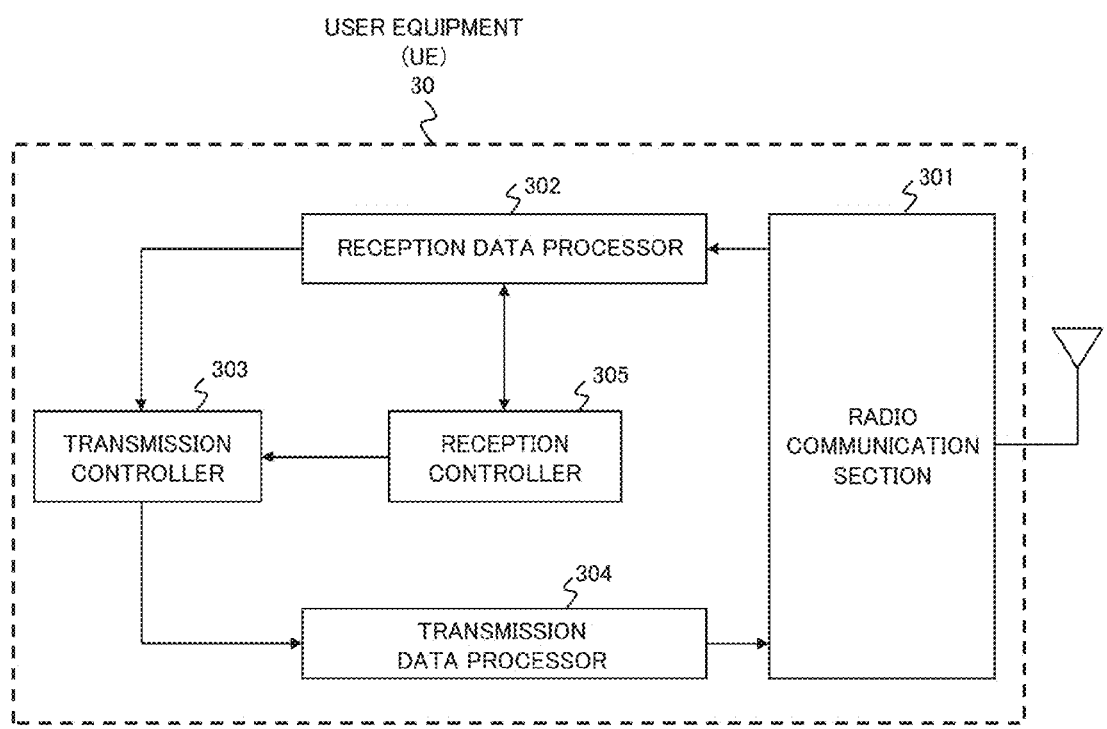
FIG. 6 is a block diagram of an illustrative configuration of a mobile station (UE) which is common for the illustrative embodiments.

Referring to FIG. 6, UE 30 includes a radio communication section 301, reception data processor 302, a transmission controller 303, transmission data processor 304 and reception controller 305. The radio communication section 301 receives radio signals from the DeNB 10 or RN 20 through an antenna. The reception data processor 302 performs a process for retrieving data from the received downlink signals and notifies the transmission controller 303, which controls the transmission operation of the UE 30, of the reception processing result. The transmission controller 303 then transmits the reception processing result to the DeNB 10 or RN 20 through the transmission data processor 304 and the radio communication section 301.

On the other hand, when data to be transmitted are generated, the transmission data processor 304 outputs the transmission data under the control of the transmission controller 303 to the communication section 301. The radio communication section 301 creates uplink signals from the transmission data received from the transmission data processor 304, and transmits them to the DeNB 10 or RN 20.

1. First Illustrative Embodiment

According to the first illustrative embodiment, DeNBs exchange with each other, backhaul subframe configuration applied at the RN registered to each of the DeNBs and each DeNB updates backhaul subframe configurations applied at its RNs based on the received backhaul subframe configuration applied at the RN registered to the other DeNB. Accordingly, each DeNB can update backhaul subframe configuration applied at a RN registered to itself so as to achieve the optimum backhaul subframe coordination that maximizes the capacity of the RN. Taking as an example the network shown in FIG. 3, a control operation of the above-mention system according to the first illustrative embodiment will be explained by making references to FIGS. 7-11.

1.1) System Operation

Figure 7:
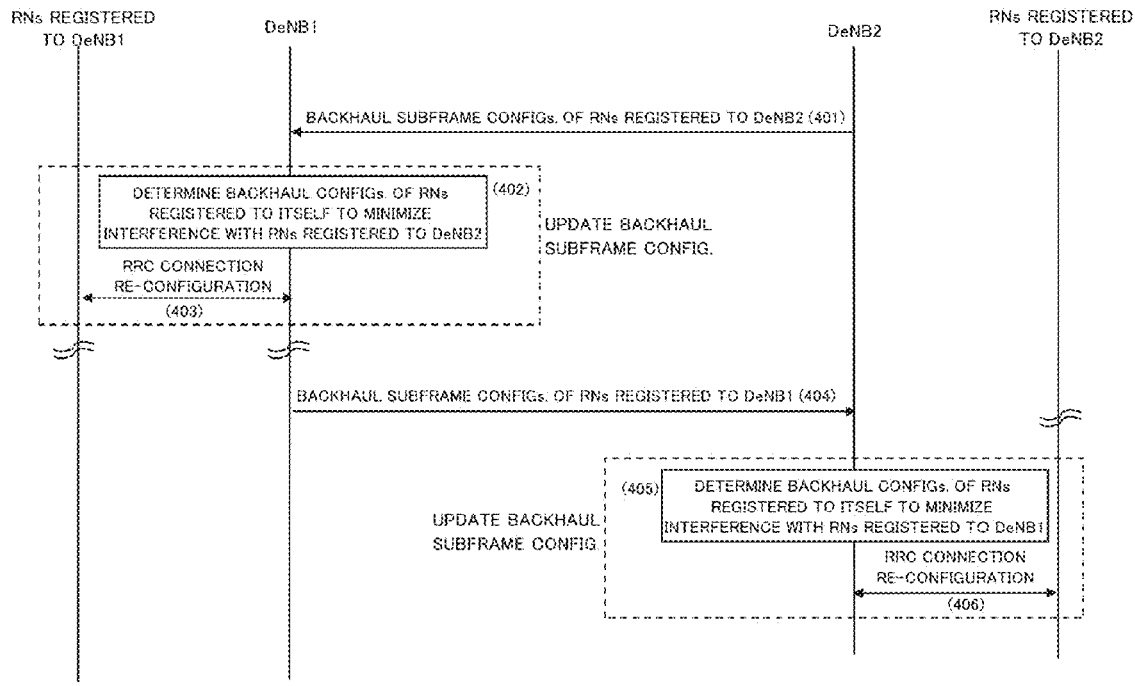
FIG. 7 is a sequence diagram showing the communication control method of the radio communication system according to a first illustrative embodiment.

Referring to FIG. 7, the DeNB2 sends backhaul subframe configurations of RNs registered to itself to the DeNB1 (operation 401). Based on the backhaul subframe configurations received from the DeNB2, the DeNB1 determines the backhaul configurations of RNs registered to itself so as to minimize interference with the RNs registered to the DeNB2 (operation 402). Thereafter, the DeNB1 performs RRC connection re-configuration to apply the determined backhaul subframe configurations (operation 403). The update of backhaul subframe configuration will be described later.

The DeNB2 also performs the operations similar to the above-mentioned operations at the DeNB1. Specifically, the DeNB2 receives the backhaul subframe configuration of RNs registered to the DeNB1 (operation 404) and uses the backhaul subframe configuration of RN registered to the DeNB1 to determine the backhaul configuration of its own so as to minimize interference with RNs registered to the DeNB1 (operation 405) and performs RRC connection re-configuration to apply the determined backhaul subframe configuration (operation 406).

In this way, each DeNB exchanges with another DeNB backhaul subframe configuration applied at the RN registered to the another DeNB and determines the backhaul configurations of RNs registered to itself so as to minimize interference with RNs registered to the another DeNB.

As a modified example, a request-based acquisition of backhaul subframe configuration may be employed. Specifically, each DeNB can request a report of backhaul subframe configurations of RNs registered to another DeNB and acquire the backhaul subframe configurations of RNs registered to the another DeNB.

1.2) DeNB Operation

Figure 8:
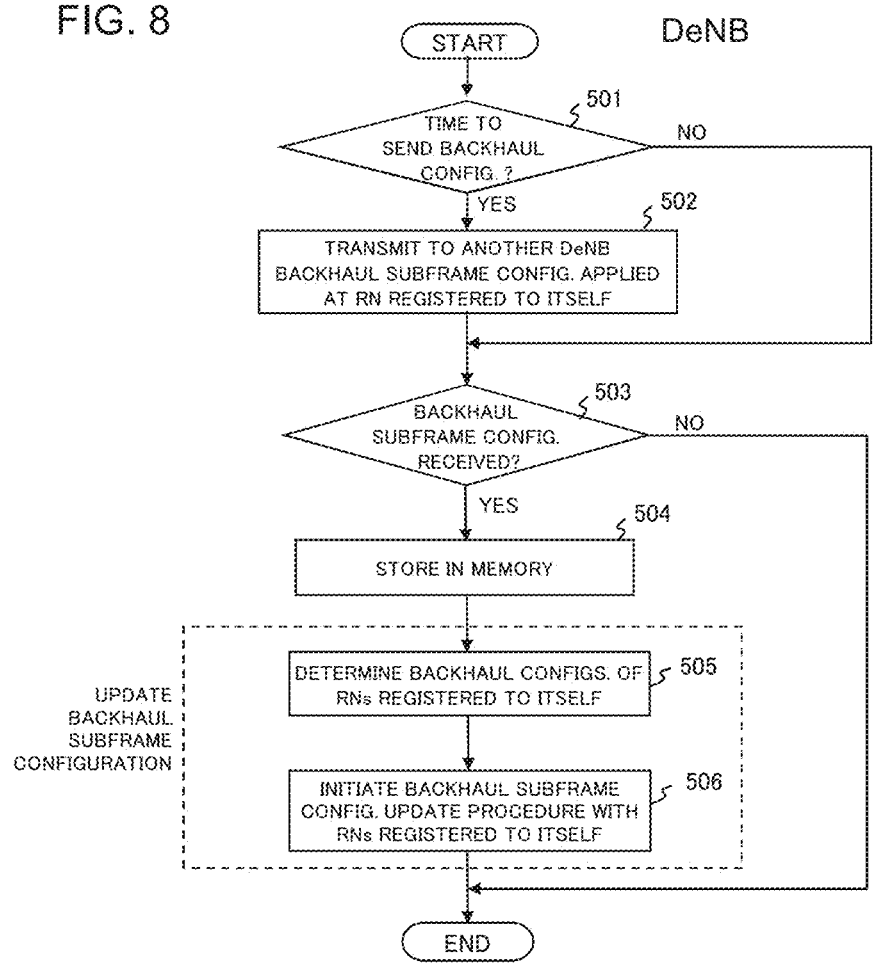
FIG. 8 is a flow chart showing the communication control method of the base station (DeNB) according to the first illustrative embodiment.

Referring to FIG. 8, the scheduler 105 checks whether it is time to send backhaul subframe configuration of RNs registered to itself (operation 501). Time to send the backhaul subframe configuration can be controlled by operator or periodically, or when there is a change in backhaul subframe configuration applied at RN registered to itself. When it is time to send the backhaul subframe configuration (operation 501; YES), the backhaul subframe configuration acquisition controller 107 controls the scheduler 105 and transmits to another DeNB the backhaul subframe configuration of RNs registered to itself (operation 502). When it is not time to send the backhaul subframe configuration (operation 501; NO), the backhaul subframe configuration acquisition controller 107 skips the operation 502.

When receiving backhaul subframe configuration from the another DeNB (operation 503; YES), the backhaul subframe configuration acquisition controller 107 stores the received backhaul subframe configuration in the memory 106 (operation 504) and determines the backhaul configurations of RNs registered to itself based on the backhaul subframe configuration stored in the memory 106 (operation 505). The backhaul subframe configuration acquisition controller 107 initiates the procedure of updating backhaul subframe configuration of RNs registered to itself according to the determined backhaul subframe configuration (operation 506). When receiving no backhaul subframe configuration from the another DeNB (operation 503; NO), the present procedure is terminated.

1.3) RN Operation

Figure 9:
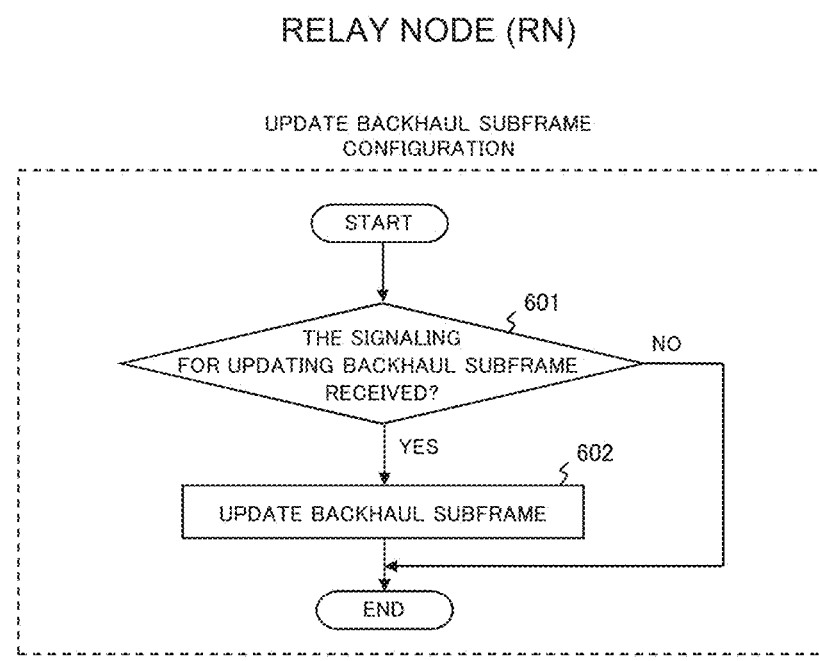
FIG. 9 is a flow chart showing the communication control method of the relay node (RN) according to the first illustrative embodiment.

Referring to FIG. 9, when receiving the signaling for updating backhaul subframe from DeNB10 (here, DeNB1 or DeNB2) (operation 601; YES), the scheduler 205 stores information included in the signaling in the memory 206 and updates backhaul subframes according to the stored information (operation 602).

1.4) Example

The backhaul subframe configuration can be determined by Initialization and Optimization.
(Initialization)
Assuming current backhaul subframe configurations as shown in FIG. 10, system constraint derived from current backhaul subframe configurations is as follows:
Number of backhaul subframes at DeNB1=2, and
Number of backhaul subframes at each RN registered DeNB1=1.
Current number of RL interefering subframes $(S_0)=7+7$, which is the sum total of non-backhaul subframes of RN1 overlapping with other RNs and non-backhaul subframes of RN3 overlapping with other RN.
(Optimization)
As shown in FIG. 11, the algorithm for Optimization will be described as follows:
Step 1. Set b=1, where b=Index of RN registered to DeNB1.
Step 2. Vary backhaul subframe configuration of the b-th RN assuming that the backhaul subframe configurations of other RNs registered to DeNB1 and registered to DeNB2 are fixed, under the system constraint.

Step 3. Evaluate the number of RL interefering subframes ($S_{update}$) with respect to the variation in the backhaul subframe configuration of the b-th RN.

Step 4. If $S_{update}<S_0$, replace the current backhaul subframe configuration with the variation. Otherwise, keep the current backhaul subframe configuration.

Step 5. Repeat Steps 2 to 4 until all variations of backhaul subframe configuration of the b-th RN are evaluated.

Step 6. Update b=b+1.

Step 7. Repeat Steps 2 to 6 until all RNs registered to DeNB1 are evaluated.

1.5) Advantageous Effect

As described above, according to the first illustrative embodiment, each DeNB can know backhaul subframe configuration applied at RN registered to a different DeNB. Accordingly, each DeNB can update backhaul subframe configurations applied at its RNs, allowing coordination of interference from RN registered to the different DeNB.

2. Second Illustrative Embodiment

According to the second illustrative embodiment, DeNBs exchange with each other, backhaul subframe configuration applied at itself. Accordingly, each DeNB can update backhaul subframe configurations applied at its RNs based on the received backhaul subframe configuration applied at another DeNB, enabling coordination of interference from RN registered to the another DeNB. Taking as an example the network shown in FIG. 3, a control operation of the above-mention system according to the second illustrative embodiment will be explained by making references to FIGS. 12 and 13.

2.1) System Operation

Figure 12:
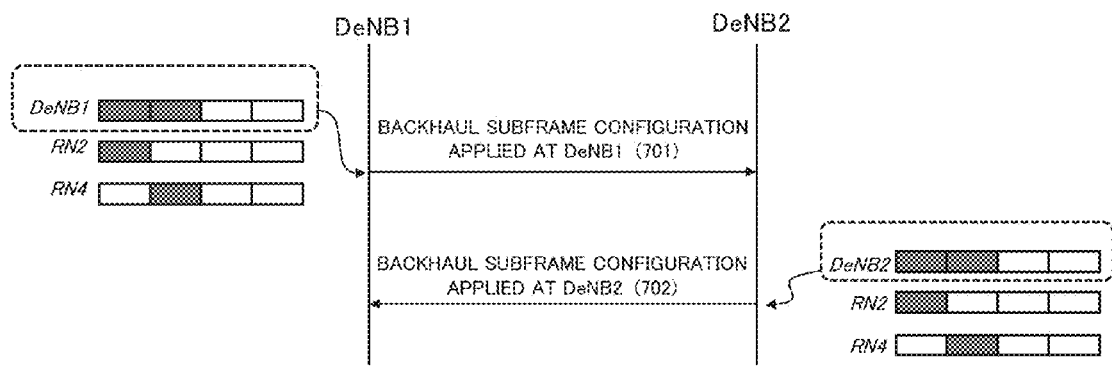
FIG. 12 is a sequence diagram showing the communication control method of the radio communication system according to a second illustrative embodiment.

Referring to FIG. 12, DeNB1 sends backhaul subframe configuration applied at itself to DeNB2 (operation 701). Similarly, the DeNB2 sends backhaul subframe configuration applied at itself to the DeNB1 (operation 702). As a modified example, a request-based acquisition of backhaul subframe configuration may be employed as described in the first illustrative embodiment. The updates of backhaul subframe configuration are similar to the operations (402-403, 405-406) described in FIG. 7 and therefore detailed descriptions are omitted.

2.2) DeNB Operation

Figure 13:
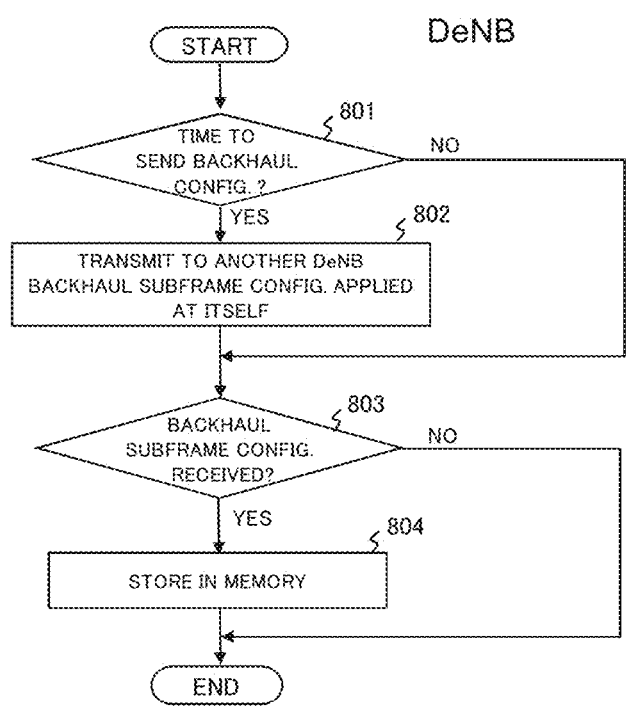
FIG. 13 is a flow chart showing the communication control method of the base station (DeNB) according to the second illustrative embodiment.

Referring to FIG. 13, the scheduler 105 checks whether it is time to send backhaul subframe configuration applied to itself (operation 801). Time to send the backhaul subframe configuration can be controlled by operator or periodically, or when there is a change in backhaul subframe configuration applied to itself. When it is time to send the backhaul subframe configuration (operation 801; YES), the backhaul subframe configuration acquisition controller 107 controls the scheduler 105 and transmits to another DeNB the backhaul subframe configuration applied to itself (operation 802). When it is not time to send the backhaul subframe configuration (operation 801; NO), the backhaul subframe configuration acquisition controller 107 skips the operation 802.

When receiving backhaul subframe configuration from the another DeNB (operation 803; YES), the backhaul subframe configuration acquisition controller 107 stores the received backhaul subframe configuration in the memory 106 (operation 804). Thereafter, as described in the operations 505 and 506 as shown in FIG. 8, the update of backhaul subframe configuration can be performed.

2.3) Advantageous Effect

As described above, according to the second illustrative embodiment, advantageous effects similar to those of the first illustrative embodiment can be obtained. In addition, since each DeNB sends the backhaul subframe configuration applied at itself to another DeNB, each DeNB can notify the another DeNB, with less amount of information, of approximation of backhaul subframe configuration applied at its RN, enabling each DeNB to reduce amount of signaling overhead in the network, compared to the first illustrative embodiment.

3. Third Illustrative Embodiment

According to the third illustrative embodiment, each RN broadcasts system information including backhaul subframe configuration of its own and each RN registered to a DeNB is capable of detecting system information broadcasted by another RN registered to a different DeNB. Each RN registered to the DeNB, when receiving the system information from the another RN, reports it to the DeNB. In this way, the DeNB can acquire backhaul subframe configuration of RN registered to the different DeNB and update backhaul subframe configurations applied at RNs registered to itself as described in the first illustrative embodiment. First, a radio communication system to which the third illustrative embodiment is applied will be explained as an example by making references to FIG. 14.

Figure 14:
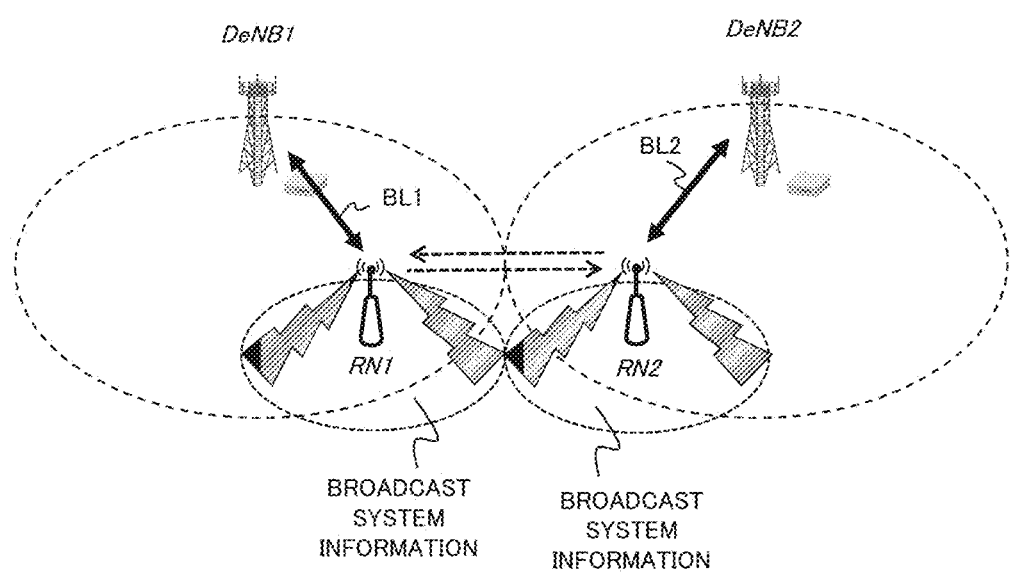
FIG. 14 is a schematic diagram showing a radio communication system for explaining an operation of a third illustrative embodiment.

As shown in FIG. 14, it is assumed for simplicity that a radio communication system is comprised of a plurality of nodes which include base stations (DeNB1, DeNB2) and relay nodes (RN1, RN2). The DeNB1 and DeNB2 provide radio connections to the RN1 and RN2 through backhaul links (or Un links) BL1 and BL2, respectively. The RN1 and RN2 broadcast system information including backhaul subframe configurations provided by the DeNB1 and DeNB2, respectively. Each of the RN1 and RN2 is provided with the backhaul subframe configuration detection controller 207 as shown in FIG. 5.

System information broadcasted by each RN includes the followings:

Downlink cell bandwidth of the RN
Uplink cell bandwidth of the RN
Parameters for accessing RN-cell
Information indicating backhaul subframe configuration applied at the RN (e.g. Index of subframe configured as MBSFN subframe in LTE-A system)

Taking as an example the network shown in FIG. 14, a control operation of the system according to the third illustrative embodiment will be explained by making references to FIGS. 15-17.

3.1) System Operation

Figure 15:
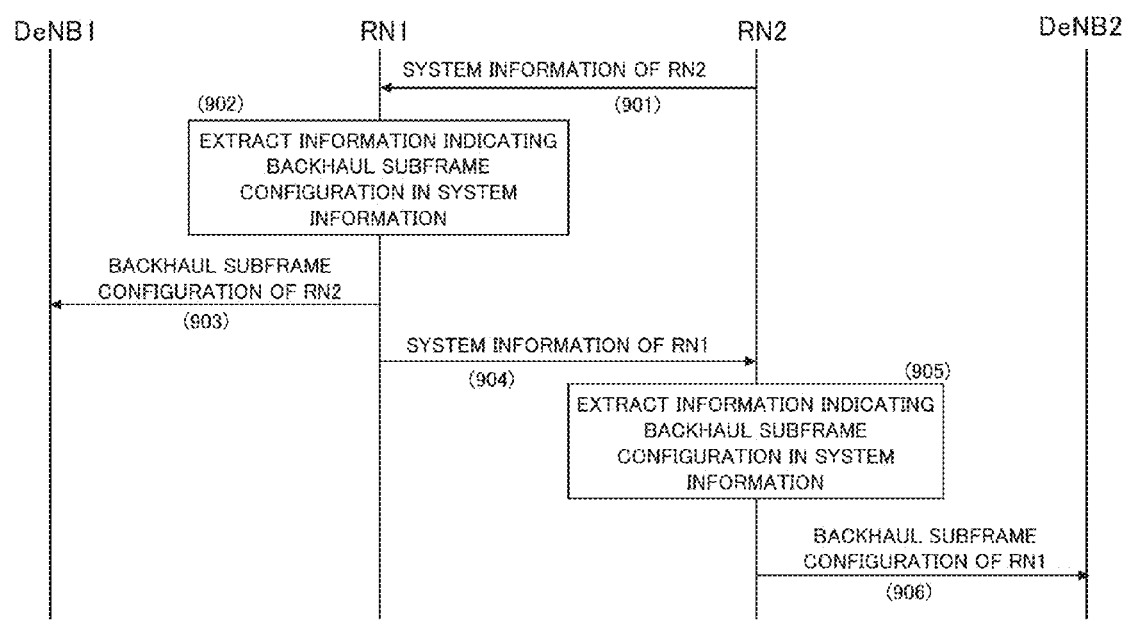
FIG. 15 is a schematic diagram showing a radio communication system for explaining an operation of the third illustrative embodiment.

Referring to FIG. 15, when receiving the system information broadcasted by the RN2 (operation 901), the RN1 extracts information about the backhaul subframe configuration of the RN2 from the received system information (operation 902) and reports the backhaul subframe configuration of the RN2 to the DeNB1 registering the RN1 (operation 903).

Similarly, when receiving the system information broadcasted by the RN1 (operation 904), the RN2 extracts information about the backhaul subframe configuration of the RN1 from the received system information (operation 905) and reports the backhaul subframe configuration of the RN1 to the DeNB2 registering the RN2 (operation 906). The coordination and update of backhaul subframe configuration are similar to those described in FIG. 7 and therefore detailed descriptions are omitted.

3.2) RN Operation

Figure 16:
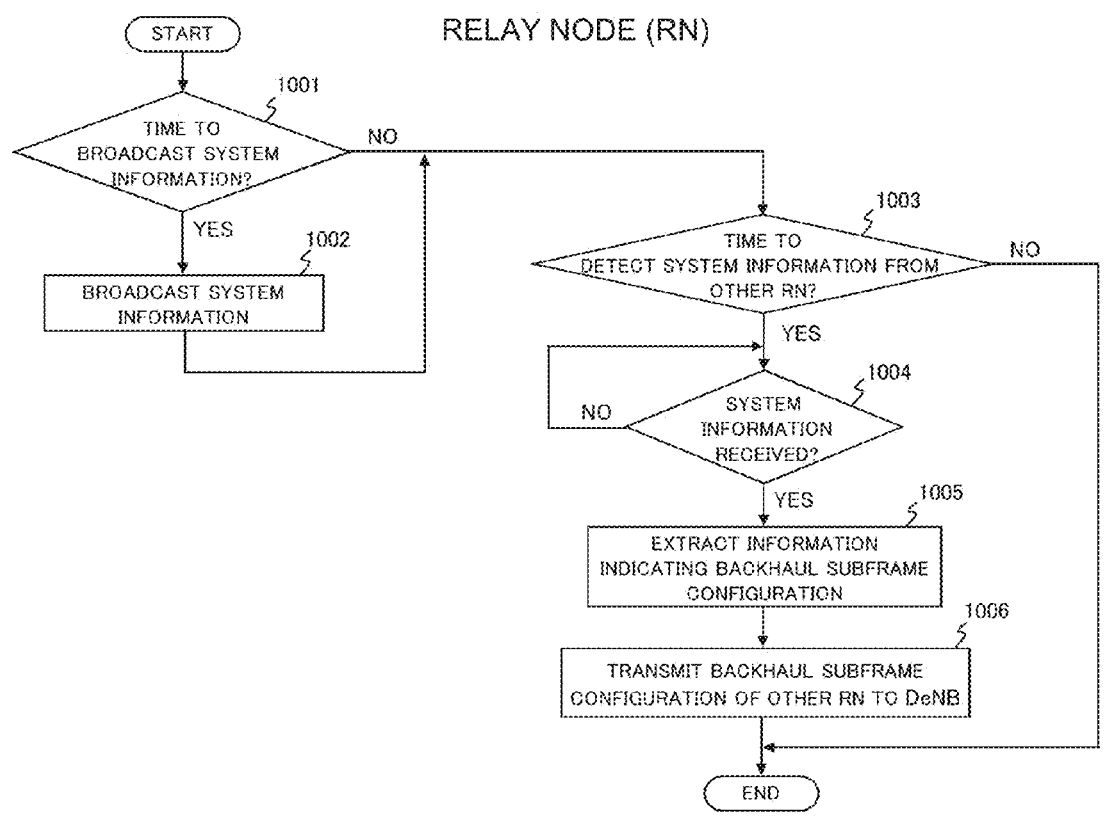
FIG. 16 is a sequence diagram showing the communication control method of the relay node (RN) according to the third illustrative embodiment.

Referring to FIG. 16, the scheduler 205 checks whether it is time to broadcast system information including the backhaul subframe configuration applied to itself (operation 1001). Time to broadcast the system information can be controlled by operator or periodically, when there is a change in the neighbor cell list of RN, or when receiving a broadcast request from the DeNB registering the RN itself. When it is time to broadcast the system information (operation 1001; YES), the scheduler 205 broadcasts the system information (operation 1002).

When it is not time to broadcast the system information (operation 1001; NO) or after the system information has been broadcasted, the scheduler 205 checks whether it is time to detect system information received from another RN (operation 1003). Time to detect the system information can be controlled by operator or periodically, when there is a change in backhaul subframe configuration applied to itself, when there is a change in the neighbor cell list of RN, or when receiving a broadcast request from the DeNB registering the RN itself. It should be noted that the time to broadcast (operation 1001) and the time to detect (operation 1003) are set to be different.

When it is time to detect system information received from another RN (operation 1003; YES), the scheduler 205 instructs the backhaul subframe configuration detection controller 207 to check whether system information is received (operation 1004). When receiving system information (operation 1004; YES), the backhaul subframe configuration detection controller 207 extracts the backhaul subframe configuration from the received system information (operation 1005) and transmits the extracted backhaul subframe configuration of another RN to the DeNB registering the RN itself (operation 1006). When it is not time to detect system information (operation 1003; NO), the present procedure is terminated.

3.3) DeNB Operation

Figure 17:
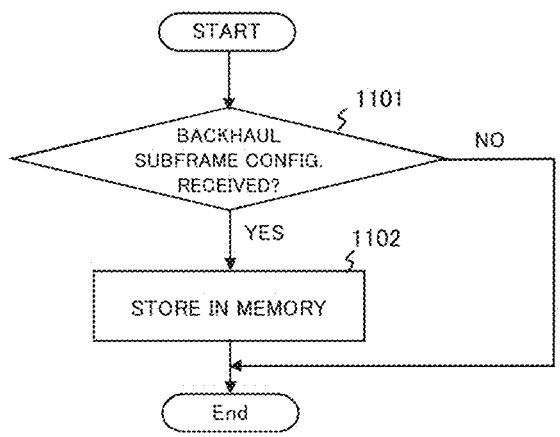
FIG. 17 is a flow chart showing the communication control method of the base station (DeNB) according to the third illustrative embodiment.

Referring to FIG. 17, the backhaul subframe configuration acquisition controller 107 determines whether the backhaul subframe configuration of another RN registered to a different DeNB is received from a RN registered to itself (operation 1101). When the backhaul subframe configuration of another RN registered to a different DeNB is received (operation 1101; YES), the backhaul subframe configuration acquisition controller 107 stores the backhaul subframe configuration of the another RN in the memory 106 (operation 1102).

When acquiring the backhaul subframe configuration of the another DeNB, the backhaul subframe configuration acquisition controller 107 stores the received backhaul subframe configuration in the memory 106 and, as described in the operations 505 and 506 as shown in FIG. 8, the update of backhaul subframe configuration can be performed.

3.4) Advantageous Effect

As described above, according to the third illustrative embodiment, RN can also have knowledge of backhaul subframe configuration applied at adjacent RN, enabling measurement of interference from adjacent RN at accurate timing. Other advantageous effects of the third illustrative embodiment including update and coordination of backhaul subframe configurations are similar to those of the first illustrative embodiment.

4. Fourth Illustrative Embodiment

According to the fourth illustrative embodiment, each RN detects downlink transmission data from another RN, determines backhaul subframe configuration based on the detected data, and reports to its DeNB, the backhaul subframe configuration applied at another RN. In this way, the DeNB can acquire backhaul subframe configuration of RN registered to a different DeNB and update backhaul subframe configurations applied at RNs registered to itself as described in the first illustrative embodiment. First, a radio communication system to which the fourth illustrative embodiment is applied will be explained as an example by making references to FIG. 18.

Figure 18A:
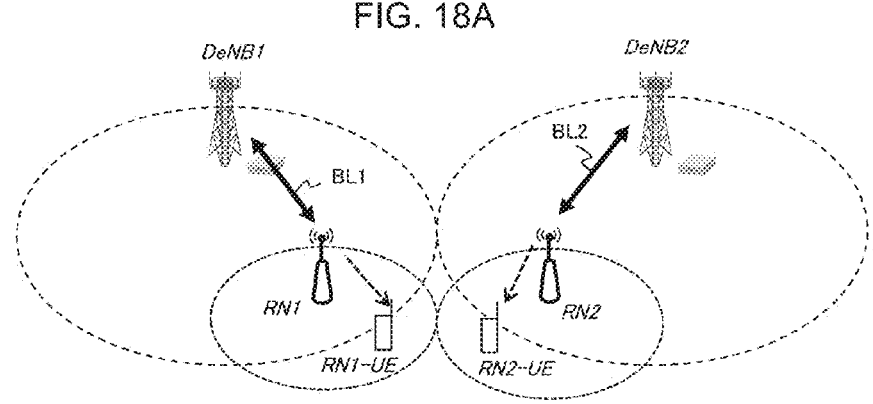
FIG. 18(A) is a schematic diagram showing a radio communication system for explaining an operation of a fourth illustrative embodiment and FIG. 18(B) is a diagram showing a format of downlink transmission data of RN.
Figure 18B:
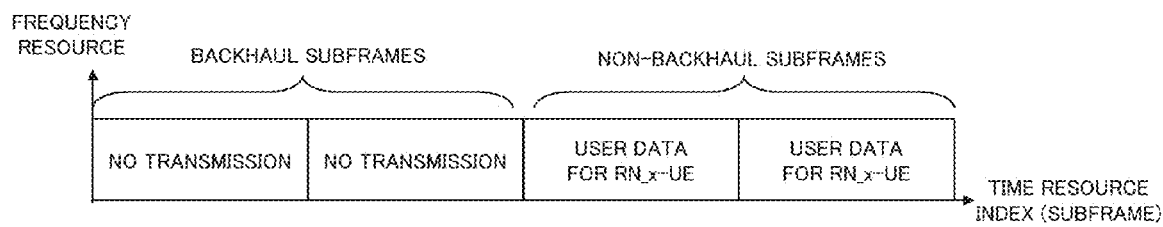

As shown in FIG. 18(A), it is assumed for simplicity that a radio communication system is comprised of a plurality of nodes which include base stations (DeNB1, DeNB2) and relay nodes (RN1, RN2) which are adjacent to each other. The DeNB1 and DeNB2 provide radio connections to the RN1 and RN2 through backhaul links (or Un links) BL1 and BL2, respectively. The RN1 and RN2 transmit downlink user data to the RN1-UE and RN2-UE, respectively, and one RN can obtain information about backhaul subframe configuration of the other RN by detecting the downlink transmission of user data of the other RN as shown in FIG. 18(B). Each of the RN1 and RN2 is provided with the backhaul subframe configuration detection controller 207 as shown in FIG. 5. Taking as an example the network shown in FIG. 18, a control operation of the system according to the fourth illustrative embodiment will be explained by making references to FIGS. 19 and 20.

4.1) System Operation

Figure 19:
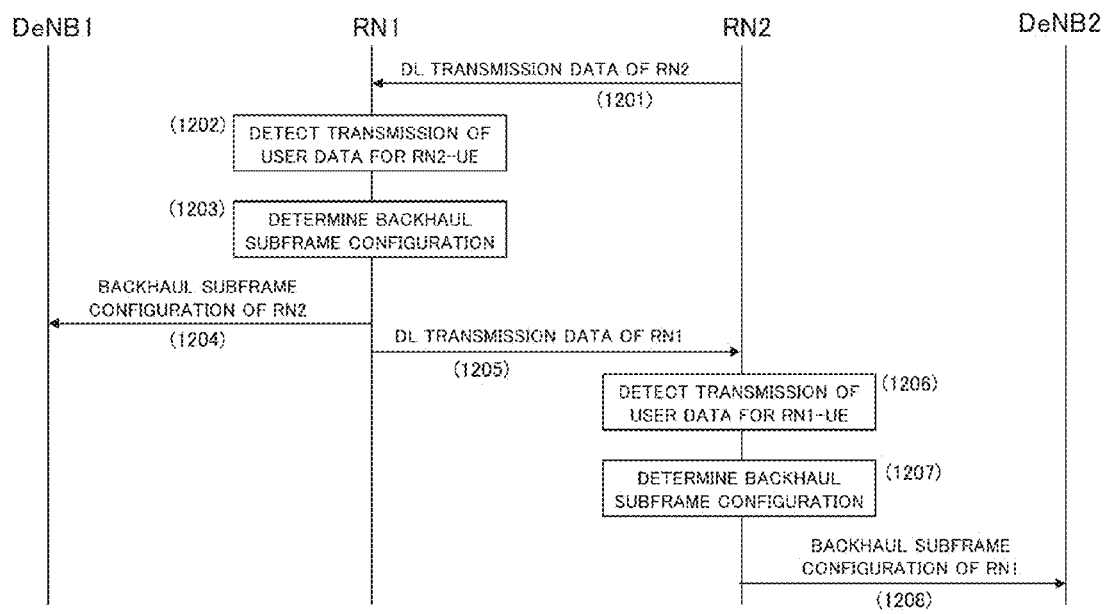
FIG. 19 is a sequence diagram showing the communication control method of the radio communication system according to the fourth illustrative embodiment.

Referring to FIG. 19, it is assumed that the RN2 transmits downlink user data to the RN2-UE at scheduled subframes (operation 1201). When detecting the transmission of user data for the RN2-UE (operation 1202), the RN1 determines the backhaul subframe configuration based on the detected transmission of the user data for the RN2-UE (operation 1203) and reports the backhaul subframe configuration of the RN2 to the DeNB1 registering the RN1 (operation 1204).

Similarly, when the RN1 transmits downlink user data to the RN1-UE at scheduled subframes (operation 1206), the RN2 detects the transmission of user data for the RN1-UE (operation 1206). The RN2 determines the backhaul subframe configuration based on the detected transmission of the user data for the RN1-UE (operation 1207) and reports the backhaul subframe configuration of the RN1 to the DeNB2 registering the RN2 (operation 1208). The update and coordination of backhaul subframe configuration are similar to those described in FIG. 7 and therefore detailed descriptions are omitted.

4.2) RN Operation

Figure 20:
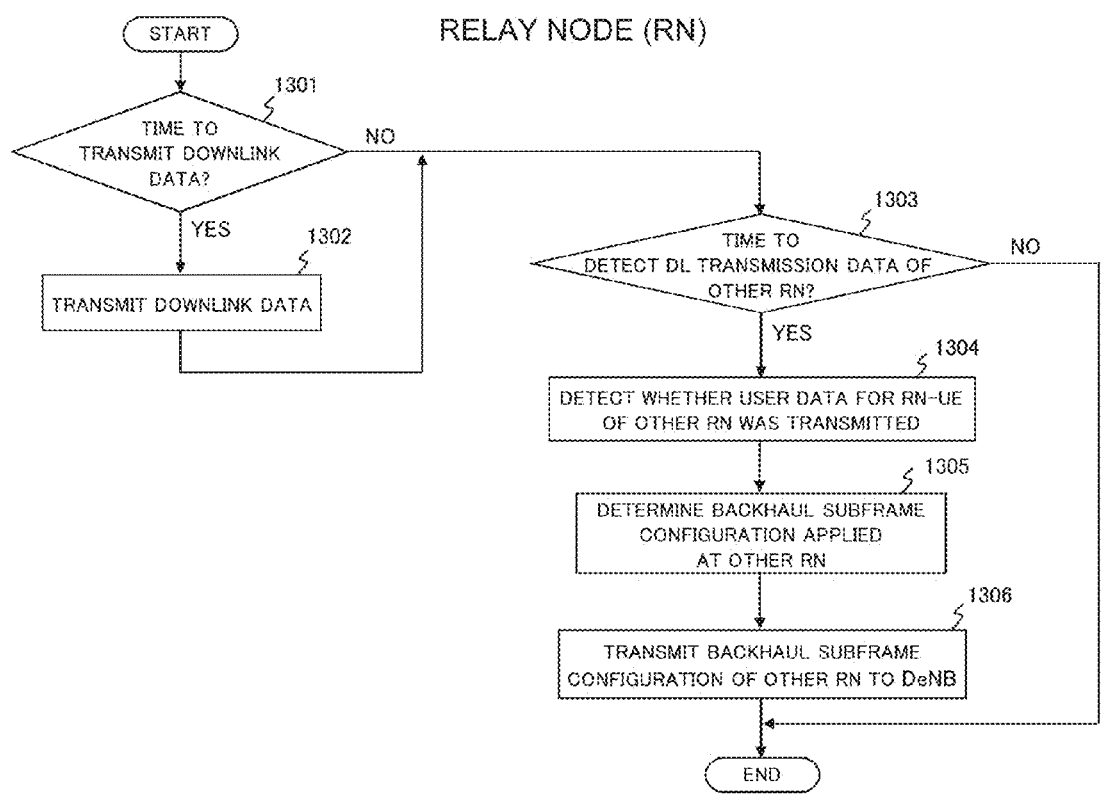
FIG. 20 is a flow chart showing the communication control method of the relay node (RN) according to the fourth illustrative embodiment.

Referring to FIG. 20, the scheduler 205 checks whether it is time to transmit downlink user data (operation 1301). Time to transmit downlink user data can be controlled by operator or periodically, when there is a change in the neighbor cell list of RN, or when receiving a request from the DeNB registering the RN itself. When it is time to transmit downlink user data (operation 1301; YES), the scheduler 205 transmit downlink user data (operation 1302).

When it is not time to transmit downlink user data (operation 1301; NO) or after the downlink user data has been transmitted, the scheduler 205 checks whether it is time to detect downlink transmission of user data of another RN (operation 1303). Time to detect the downlink transmission of user data of another RN can be controlled by operator or periodically, when there is a change in backhaul subframe configuration applied to itself, when there is a change in the neighbor cell list of RN, or when receiving a request from the DeNB registering the RN itself. It should be noted that the time to transmit (operation 1301) and the time to detect (operation 1303) are set to be different.

When it is time to detect downlink user data (operation 1303; YES), the scheduler 205 instructs the backhaul subframe configuration detection controller 207 to check whether user data for RN-UE of other RN was transmitted (operation 1304). The detection of transmission of user data for RN-UE of the other RN is as follows:

Let y(k,l) be the received signal at the k-th subcarrier & the l-th subframe of the RN performing detection, where y(k,l) can be mathematically expressed as $$y(k,l)=h(k,l) \times x(k,l)+n(k,l)$$

where h(k,l) denotes channel coefficient from the transmitting RN, x(k,l) denotes user data for RN-UE from the transmitting RN, and n(k,l) denotes AWGN with zero mean and variance of N, at the RN performing detection.

The detection can be implemented by the following algorithm:

If $|y(k,l)|^2 >= cN$, decide that user data was transmitted

Otherwise, decide that user data was NOT transmitted where c is a predefined constant for adjusting detection sensitivity.

When the transmission of user data for RN-UE of the other RN has been detected, the backhaul subframe configuration detection controller 207 determines the backhaul subframe configuration applied to the other RN (operation 1305). The determination of backhaul subframe configuration is as follows:

The l-th subframe is determined whether it is a backhaul subframe by the following algorithm:

If the following inequality is satisfied:

[Math.1]

$$\sum_{k}^{K} |y[k,l]|^2 \geq K \cdot c \cdot N$$

it is determined that the l-th subframe is a NON-backhaul subframe,

Otherwise, it is a backhaul subframe, where K is a total number of subcarriers.

Subsequently, the scheduler 205 transmits the determined backhaul subframe configuration of another RN to the DeNB registering the RN itself (operation 1306). When it is not time to detect downlink transmission data (operation 1303; NO), the present procedure is terminated.

4.4) Advantageous Effect

As described above, according to the fourth illustrative embodiment, RN can also have knowledge of backhaul subframe configuration applied at adjacent RN, enabling measurement of interference from adjacent RN at accurate timing. Other advantageous effects of the fourth illustrative embodiment including update and coordination of backhaul subframe configuration are similar to those of the first illustrative embodiment.

4.5) Variations

In the case where the reference signal known also by the RN performing detection is transmitted together with the user data for RN-UE, the following variations can be implemented:

a) Detect whether the reference signal was transmitted instead of the user data; or b) Estimate channel coefficient with the reference signal, and use the estimated channel coefficient for detecting whether the user data was transmitted.

INDUSTRIAL APPLICABILITY

The present invention can be applied to a communication system with relay nodes.

REFERENCE SIGNS LIST

10 Base station (DeNB)
20 Relay node (RN)
30 User equipment (UE)
BL1-BL4 Backhaul link
RL1-RL4 RN-access link
DL1-DL2 DeNB-access link

The invention claimed is:

1. A communication system comprising a plurality of communication nodes which includes a plurality of base stations and a plurality of relay nodes, wherein each relay node has a radio connection with a base station,
   wherein a first relay node connected with a first base station acquires information indicating time resource configuration applied at a second relay node connected with a second base station, based on system information broadcasted by the second relay node and reports the information to the first base station,
   wherein, based on the information, the first base station acquires the time resource configuration applied between the second base station and the second relay node.

2. The communication system of claim 1, wherein the system information includes the information indicating backhaul subframe configuration applied at the second relay node connected with said second base station.

3. The communication system of claim 1, wherein the first relay node acquires the information by detecting transmission of downlink data by the second relay node connected with said second base station.

4. The communication system of claim 3, wherein the first relay node determines the information indicating backhaul subframe configuration applied at the second relay node, wherein the second relay node transmits the downlink data at subframes other than backhaul subframes in the backhaul subframe configuration.

5. A communication method in a communication system comprising a plurality of communication nodes which includes a plurality of base stations and a plurality of relay nodes, wherein each relay node has a radio connection with a base station, the method comprising:
　at a first relay node connected with a first base station:
　　acquiring information indicating a time resource configuration applied at a second relay node connected with a second base station based on system information broadcasted by the second relay node; and
　　reporting the information to the first base station; and
　at the first base station:
　　acquiring the time resource configuration applied between the second base station and the second relay node based on the information.

6. The communication method of claim 5, wherein the system information includes the information indicating backhaul subframe configuration applied at the second relay node connected with the second base station.

7. The communication method of claim 5, wherein the step of acquiring the information comprises:
　detecting transmission of downlink data by the second relay node connected with the second base station; and
　acquiring the information based on the detected transmission of the downlink data.

8. The communication method of claim 7, wherein the second relay node transmits the downlink data at subframes other than backhaul subframes in the backhaul subframe configuration, wherein the first relay node determines the information indicating backhaul subframe configuration applied at the second relay node.

9. A base station in a communication system comprising a plurality of communication nodes which includes a plurality of base station and a plurality of relay nodes, wherein each relay node has a radio connection with a base station, comprising:
　a communication unit that is configured to communicate with a first relay node by a radio interface and to communicate with another base station by a predetermined interface; and
　a controller configured to:
　　receive information indicating time resource configuration applied at a second relay node connected with said another base station, from the first relay node, wherein the first relay node acquires the information based on system information broadcasted by the second relay node; and
　　acquire time resource configuration applied between said another base station and the second relay node based on the information.

* * * * *